(12) United States Patent
Hoffmann et al.

(10) Patent No.: US 8,215,440 B2
(45) Date of Patent: Jul. 10, 2012

(54) DRIVE TRAIN FOR A VEHICLE WITH CONNECTABLE SECONDARY AXLE

(75) Inventors: Werner Hoffmann, Siegburg (DE); Hans-Peter Nett, Adenau (DE); Michael Hoeck, Neunkirchen-Seelscheid (DE); Jan Potulski, Cologne (DE); Matthias Adelt, Bochum (DE)

(73) Assignee: Getrag Driveline Systems, GmbH, Cologne (DE)

( * ) Notice: Subject to any disclaimer, the term of this patent is extended or adjusted under 35 U.S.C. 154(b) by 411 days.

(21) Appl. No.: 12/433,672

(22) Filed: Apr. 30, 2009

(65) Prior Publication Data

US 2009/0277711 A1 Nov. 12, 2009

(30) Foreign Application Priority Data

May 6, 2008 (DE) .......................... 10 2008 002 844
Nov. 13, 2008 (DE) .......................... 10 2008 057 272

(51) Int. Cl.
*B60K 17/354* (2006.01)

(52) U.S. Cl. ......... 180/247; 180/233; 180/244; 180/245
(58) Field of Classification Search .................. 180/233, 180/244, 245, 247, 248, 249, 250
See application file for complete search history.

(56) References Cited

U.S. PATENT DOCUMENTS

| 6,296,590 B1 * | 10/2001 | Gassmann | 475/231 |
| 6,837,817 B2 * | 1/2005 | Mori et al. | 475/142 |
| 7,111,716 B2 * | 9/2006 | Ekonen et al. | 192/20 |
| 2002/0144851 A1 * | 10/2002 | Porter | 180/247 |
| 2004/0106487 A1 | 6/2004 | Mori et al. | |
| 2006/0163018 A1 | 7/2006 | Ekonen et al. | |

FOREIGN PATENT DOCUMENTS

| DE | 19800328 | 7/1998 |
| DE | 102004015304 | 10/2004 |

\* cited by examiner

*Primary Examiner* — Tony H. Winner
*Assistant Examiner* — Marc Scharich
(74) *Attorney, Agent, or Firm* — Stetina Brunda Garred & Brucker

(57) ABSTRACT

A drive train of a vehicle is disclosed which comprises a permanently driven primary axle and a secondary axle connectable to the primary axle via a switch-on device with a switch-on mechanism, whereby the secondary drive train output via side shaft couplings is transferred to the drive wheels of the secondary axle. Because the switch-on mechanism and/or the side shaft couplings have frictionally engaged couplings, it can be that when the secondary axle is uncoupled, the shutdown section of the secondary drive train located between the switch-on device and the side shaft couplings is uncoupled both from the primary axle and from the secondary drive wheels, such that there is no more power loss in this shutdown section, whereby connecting the secondary drive train during travel is possible all the same and losses in comfort and practicability do not have to be tolerated.

12 Claims, 13 Drawing Sheets

DRIVE TRAIN FOR A VEHICLE WITH CONNECTABLE SECONDARY AXLE

CROSS-REFERENCE TO RELATED APPLICATIONS

The present application claims priority to German Patent Application No. 10 2008 002 844.4 filed on May 6, 2008 and German Patent Application No. 10 2008 057 272.1 filed on Nov. 13, 2008.

STATEMENT RE: FEDERALLY SPONSORED RESEARCH/DEVELOPMENT

Not applicable.

TECHNICAL FIELD OF THE INVENTION

The invention relates to a drive train of a vehicle, comprising a primary axle permanently driven by a primary drive train and a secondary axle connectable to the primary axle by a switch-on device, which can be driven by a secondary drive train, whereby the switch-on device has a switch-on mechanism via which the secondary drive train can be integrated in the drive train transferring the overall drive output, and whereby the secondary drive train output is conveyed via side shaft couplings into side shafts of the secondary axle when the secondary axle is connected and is transferred to drive wheels of the secondary axle.

DESCRIPTION OF RELATED ART

Drive trains of this type are known in automobile construction in particular as a manually connected four-wheel drive. Their purpose is to enable the driver to distribute the drive power to all drive wheels of the vehicle in specific operating situations.

On the one hand drive trains are known which enable the, secondary axle to be switched on mostly-exclusively when the vehicle is idling. These include in particular positively working, mechanical wheel hub circuits which can be coupled either expensively by hand or via switch and control units to he provided additionally in the vehicle. Also, the driver must switch the transfer gearbox over manually from single-axle drive to four-wheel drive. Switching during driving is mostly not an option due to unavailable speed synchronization of the positively engaged power transmission elements or if so is possible only at minimal speeds. It can also be necessary when switching over from all-wheel drive to single axle drive to first reverse a few meters to disengage the freewheeling mechanism. Such systems are used especially in off-road vehicles and are provided either factory-set or as a retrofit kit.

On the other hand there are drive trains also known which enable connection during travel. A connectable secondary axle is also designated as a "hang-on" axle. Here the secondary drive wheels are uncoupled from the vehicle drive by a coupling provided in the whole drive train. Frictionally engaged couplings, which enable connecting of the secondary axle during travel, are used here in particular.

Drive trains with connectable secondary axles however introduce a series of disadvantages. First, care should be taken that the drive wheels of the primary axle and the drive wheels of the secondary axle in particular travel different trajectories when driving round curves, but also in other operational situations, which without a corresponding speed difference balance would lead to tensions in the drive train. In order to lower tensions caused by different drive wheel speeds on primary axle and secondary axle longitudinal equalization or respectively longitudinal differential is to be provided. Tensions caused by different drive wheel speeds of the drive wheels of the secondary axle are offset by a transverse equalization usually formed by transverse differential. Also, starting out from the regularly driven primary axle the secondary drive train output must be transmitted to the secondary axle, which usually happens via an angular gear and an intermediate shaft to which the transverse differential connects. As compared to a vehicle which is fitted exclusively with a permanently driven primary axle, these additional system components to be provided make the drive train clearly more complex in the structural aspect. Vehicle costs in development and construction are clearly higher as a result. The larger number of required components also makes such a drive train expensive and contributes to more weight, in turn resulting in increased fuel consumption.

In addition, countless factors diminish the net drive output actually available in operation, therefore that part of the overall drive-side available drive output, which actually can be utilized for propelling the vehicle, and also whenever the secondary axle not is connected. In this case the secondary axle drive train is interrupted at a point between the primary axle and the drive wheels by the switch-on device, such that no drive power is transmitted to the secondary axle drive wheels. The components of the secondary drive train however are still being driven either by the vehicle drive via the primary axle and/or by the secondary drive wheels or respectively dragged along passively, without transmitting drive power. This gives rise to friction losses (bearing friction, churning losses, friction of gearwheel engagement, etc.) and the rotating masses of the secondary driven train components (differential, intermediate shaft, couplings, etc.) are to be accelerated or respectively relented constantly with the vehicle during dynamic driving. This power loss contributes significantly to the fact that fuel consumption in a vehicle with connectable secondary axle even with uncoupled secondary axle is noticeably higher than in a vehicle having no drivable secondary axle. If it is also considered that the operating times in which the connectable secondary axle is actually integrated actively in the whole drive train constitute only a minimal portion of the total operating times of a vehicle with connectable secondary axle, it follows that a not inconsiderable quantity of fuel could be saved over the total operating period. Clients wanting a vehicle which provides a selectively connectable secondary axle must consider increased consumption however, even if they barely make use of connecting.

BRIEF SUMMARY OF THE INVENTION

The aim of the invention is therefore to further develop a drive train of the type initially specified such that when the secondary axle is uncoupled, power loss is minimized. A further aim of the invention is to reduce the additional structural cost and the associated extra weight of a vehicle with connectable secondary axle, despite the possibility of longitudinal equalization between primary and secondary axle and the possibility of transverse equalization on the secondary axle. At the same time a drivable secondary axle should be provided which can be switched on automatically during travel, in particular also at higher speeds. Compared to manually connectable wheel hub couplings operating comfort and suitability for daily use in particular should be increased.

This task is solved according to the invention by the switch-on mechanism and/or the side shaft couplings having at least one frictionally engaged coupling and, when the secondary axle is uncoupled, the section of the secondary drive train located between the connection unit and the side shaft couplings is uncoupled both from the primary drive train, in particular from the primary axle, and from the secondary drive wheels.

When the secondary drive train is connected both the side shaft couplings and the switch-on device are coupled, enabling the secondary drive output flow from the primary axle to the secondary axle drive wheels. When the secondary drive train is disconnected both the side shaft couplings and the switch-on device are uncoupled, so that when the secondary axle is uncoupled the section of the secondary drive train located between the switch-on device and the side shaft couplings is uncoupled both from the drive power and from the drive wheels of the secondary axle. At the same time the effort should be made to shut down as many components as possible. Other measures which reduce power loss are also significant.

This configuration of the drive train makes it possible to completely shut down a majority of the secondary drive train with the secondary axle uncoupled. The drive train components belonging to the shutdown section of the secondary axle drive train consequently cause no power loss. Frictionally engaged couplings are provided particularly to match the speed of both components of the secondary drive train uncoupled from the vehicle drive and from the drive wheels of the secondary axle prior to incorporating in the whole drive train at the speed of the non-uncoupled components of the drive train.

In a preferred embodiment it is provided that when the secondary axle is connected the side shaft couplings form drive output distribution without differential from the part of the secondary drive train located between the connection unit and the side shaft couplings to the drive wheels of the secondary axle similarly to transverse differential, therefore ensure transverse equalization in particular. Transmitting the secondary drive train output to the secondary axle therefore preferably occurs not via a conventional differential gearbox, but via a purely coupling-controlled axle drive without differential. In the process the side shafts are connected in each case via a side shaft coupling to the part of the secondary axle drive train located between the switch-on device and the side shaft couplings. Since the side shaft couplings can be selected individually a defined skidding behavior can be depicted. The added advantage here is that not only transverse equalization but at the same time also longitudinal equalization can be guaranteed via the side shaft couplings. Consequently the side shaft couplings form drive output distribution without differential between the primary axle and the secondary axle similarly to longitudinal differential when the secondary axle is connected. Separately provided longitudinal equalization, for example in the form of a regulated longitudinal differential, can be omitted.

With this type of axle drive without differential, in addition to simultaneous transverse and longitudinal equalization other functions are also conceivable, such as that of an active-yaw differential, in which a yawing moment can be produced specifically by the individual actuation of the couplings. Any limit values can also be shown by the individually adjustable side shaft couplings, so that the functions of limit differential can also be realized. Omitting a plurality of otherwise necessary drive train components (wheel hub switching, transverse and longitudinal differential) makes a cost-optimized and weight-optimized configuration of the drive train possible.

In a further preferred embodiment the switch-on device has a positively working power transmission gearbox, in particular an angular gear working via cogged wheels. At the same time it should be noted that this positively working gearbox can be switched so that the tight fit is nullified when the secondary axle is not connected and the section of the secondary drive train located between the switch-on device and the side shaft couplings is uncoupled from the vehicle drive. The switch-on device is preferably arranged on the primary axle and the secondary drive train output is felt directly by a primary axle shaft preferably by the switch-on mechanism when the secondary drive train is connected. Primary axle shaft does not necessarily mean a side shaft of the primary axle. More decisive is the spatial and functional assignation of the primary axle shaft to the primary drive train. The primary axle drive shaft preferably rotates concentrically to the primary axle side shafts.

The positive power transmission gearbox must of course be synchronized for the switching procedures to be provided, therefore in particular the coupling or respectively uncoupling of the secondary drive train. Such speed synchronization can be readily guaranteed on the one hand by means of gearbox synchronization familiar to the expert. The power transmission gearbox however is preferably synchronized by the side shaft couplings to create the tight fit. If the part of the secondary drive train located between the side shaft couplings and the switch-on device for transmitting part of the available overall drive output to the secondary axle were to be switched to the whole drive train, the secondary drive train, which is then powered by the drive wheels rolling way on the street, can be graduated to switching speed and thus speed synchronization can be executed by coupling the side shaft couplings. After the synchronization speed is reached the tight fit can be made by switch-on mechanism of the switch-on device. Even if conventional synchronization were not to be omitted despite such speed matching, synchronization can be supported by the frictionally engaged side shaft couplings being lightly closed prior to coupling of the secondary drive train. Synchronous forces accordingly drop out slightly. Components can be dimensioned for lesser loads, also an advantage for the lifetime of the components.

It can also be provided that the side shaft couplings are formed by a frictionally engaged multiple disc clutch, whereby the friction plates connected torque-proof to the secondary drive wheels cooperate with an inner plate carrier and the vehicle drive-side discs cooperate with an outer plate carrier. This configuration enables the particularly energy-efficient use of an on-demand lubricating of the clutch packs without additional, external oil supply. The clutch housing forms an oil sump filled with lubricating and cooling oil, in which the coupling discs plunge. If the outer plate carrier rotates it takes the oil along with it on its exterior and delivers it to an oil circuit. This oil supply output afflicted with power loss is canceled whenever the outer plate carrier does not rotate when the coupling is open. This is possible however only if the outer plate carrier forms part of the shut-down section of the secondary drive train.

BRIEF DESCRIPTION OF THE DRAWINGS

Further characteristics and advantages of the invention will emerge from the independent claims and the following description of preferred embodiments by way of the diagrams, in which:

DETAILED DESCRIPTION OF THE INVENTION

Figure 1:
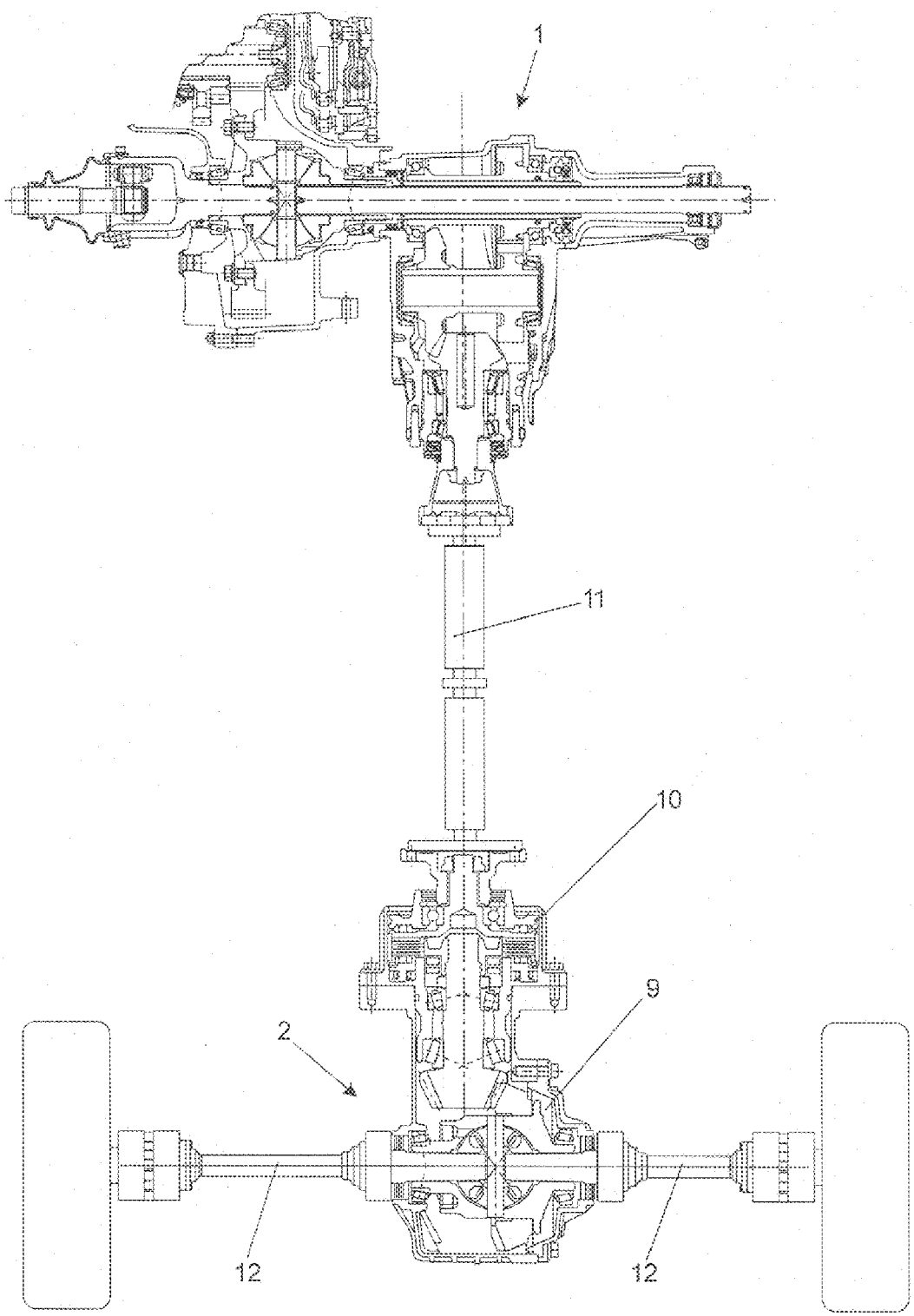
FIG. 1 illustrates a first drive train with permanently driven primary axle and connectable secondary axle, the underlying functional principle of which is known from the prior art.

FIG. 1 shows a drive train of a vehicle, which is known from the prior art with respect to its functional principle. The primary axle 1 is permanently driven. A non-switchable angular gear branches part of the drive power off from the primary axle and supplies it to the secondary drive train serving to drive the secondary axle 2. Provided in front of the axle drive unit 9 is a hang-on coupling 10 which in the closed state connects an intermediate shaft 11 and the axle drive unit 9 non-positively and is thus able to convey the secondary drive train output as required to the axle drive unit 9. The axle drive unit 9 has a conventional structure and has a bevel gear differential to which the secondary side shafts 12 attach.

Figure 2:
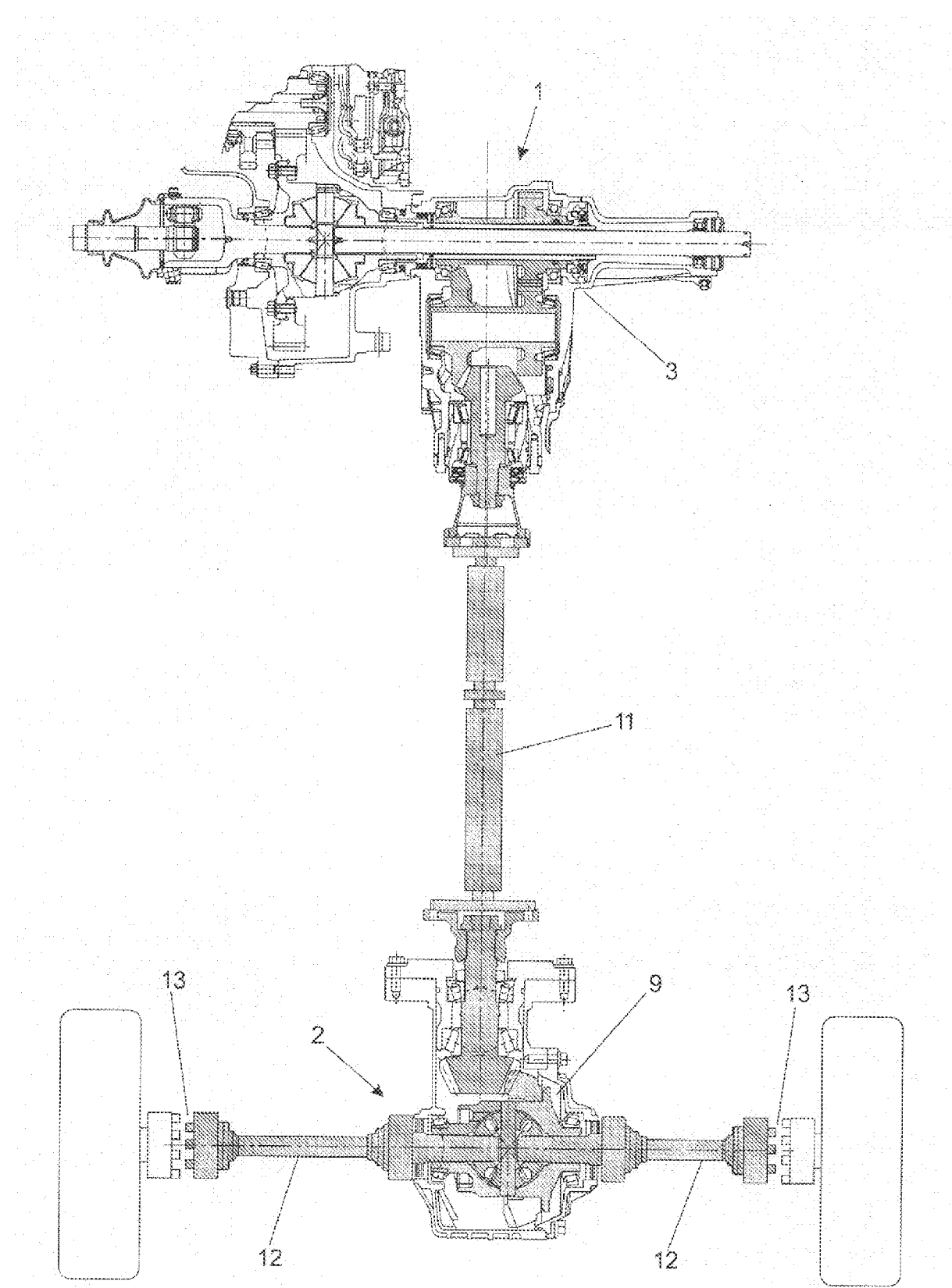
FIG. 2 illustrates a second drive train with permanently driven primary axle and connectable secondary axle, the underlying functional principle of which is known from the prior art.

FIG. 2 shows a drive train of a vehicle, the functional principle of which is likewise known from the prior art. In contrast to FIG. 1 the axle drive unit 9 is not connected to the intermediate shaft 11 via a switchable coupling, but the intermediate shaft 11 is flange-mounted solidly on the axle drive unit 9. Positively working claw couplings 13 are provided on the wheel hubs to uncouple the drive wheels of the secondary axle 2 from the drive power, and these can be engaged either manually or by connection devices to be provided in addition, which is possible only stationary due to the lack of speed synchronization and the possibility of a speed alignment between the components to be engaged. In contrast to the angular gear of the drive train arranged on the primary axle 1 of FIG. 1 the angular gear of the drive train of FIG. 2 is configured as a switchable switch-on device 3, also designated as power take-off unit, PTU in short.

Both in the drive train of FIG. 1 and the drive train of FIG. 2 the secondary drive train is not integrated in the part of the drive train transmitting the overall drive output and thus transmits no drive power to the drive wheels of the secondary axle 2.

In the example of FIG. 1 the dark-shaded secondary drive train components also rotate, as the components of the drive train, arranged on the vehicle drive side viewed from the hang-on coupling 10, are dragged along by the angular gear, whereas the secondary drive train components, arranged in the direction of the drive wheels of the secondary axle viewed from the hang-on coupling 10, are dragged along by the drive wheels rolling away on the roadbed.

In contrast to the drive train of FIG. 1 a substantial section of the secondary drive train does not rotate at the same time in the drive train of FIG. 2 (lightly shaded illustrated section), since the wheel hub couplings 13 are not engaged on the drive wheel side and the switch-on device 3 is not engaged on the vehicle drive side. The section of the secondary drive train arranged between these drive train components is therefore inoperative.

Figure 3:
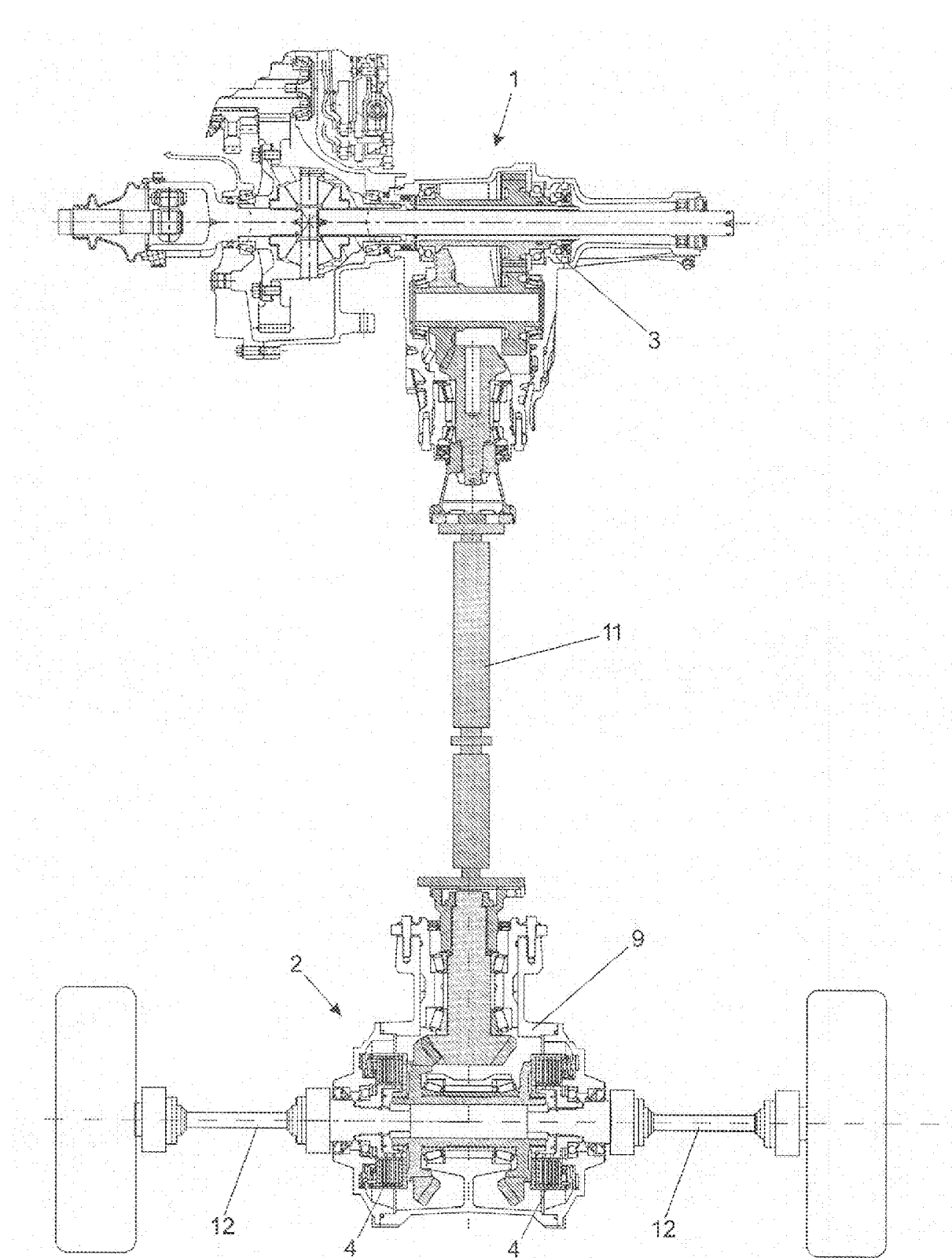
FIG. 3 illustrates a drive train with permanently driven primary axle and connectable secondary axle, the section of the secondary drive train of which located between side shaft couplings and switch-on device is shut down.

FIG. 3 shows a drive train with permanently driven primary axle 1 and connectable secondary axle 2, the section of the secondary drive train of which located between side shaft couplings 4 and switch-on device 3 is inoperative. In contrast to the axle drive units 9 of FIG. 1 and FIG. 2 the axle drive unit 9 of FIG. 3 is designed without differential. Here two frictionally engaged working side shaft couplings 4 transmit the secondary drive output to the side shafts 12 of the secondary axle 2. The drive torque and slippage to be transferred are freely adjusted by these freely adjustable side shaft couplings 4, such that with this axle drive functions of longitudinal differential and of active-yaw differential can be shown in addition to the functions of transverse differential. When compared to the axle drive units 9 of FIGS. 1 and 2 the axle drive unit 9 in FIG. 3 is designed substantially less complex and clearly lighter in the structural sense. To shut down the secondary drive train the side shaft couplings 4 are opened and the secondary drive train is uncoupled from the permanently driven part of the drive train via the switch-on device 3. Taken by itself, neither the side shaft couplings 4 nor the switch-on device 3 could execute the fundamental inventive idea; with respect to the invention rather they cooperate synergistically.

Computer comparison of the drive train concepts of FIGS. 1, 2 and 3 has shown that the power losses occurring in the overall drive trains when the secondary axle is switched off are clearly different. Whereas the power loss of the drive train of FIG. 1 at 100 km/h is around 2.7 kW due to the plurality of rotating drive train components, in a drive train according to FIG. 2 at the same speed it is around 0.08 kW only, therefore less than a thirtieth, but whereby the already specified disadvantages offer a considerable restriction of comfort and practicability for the latter drive train. The power loss occurring in the drive train of FIG. 3 at 100 km/h was calculated with 0.31 kW and is thus only marginally above the power loss of the drive train of FIG. 2, yet is around only a tenth of the power loss to be expected from the drive train of FIG. 1, without the driver having to put up with losses in comfort and practicability.

Figure 4:
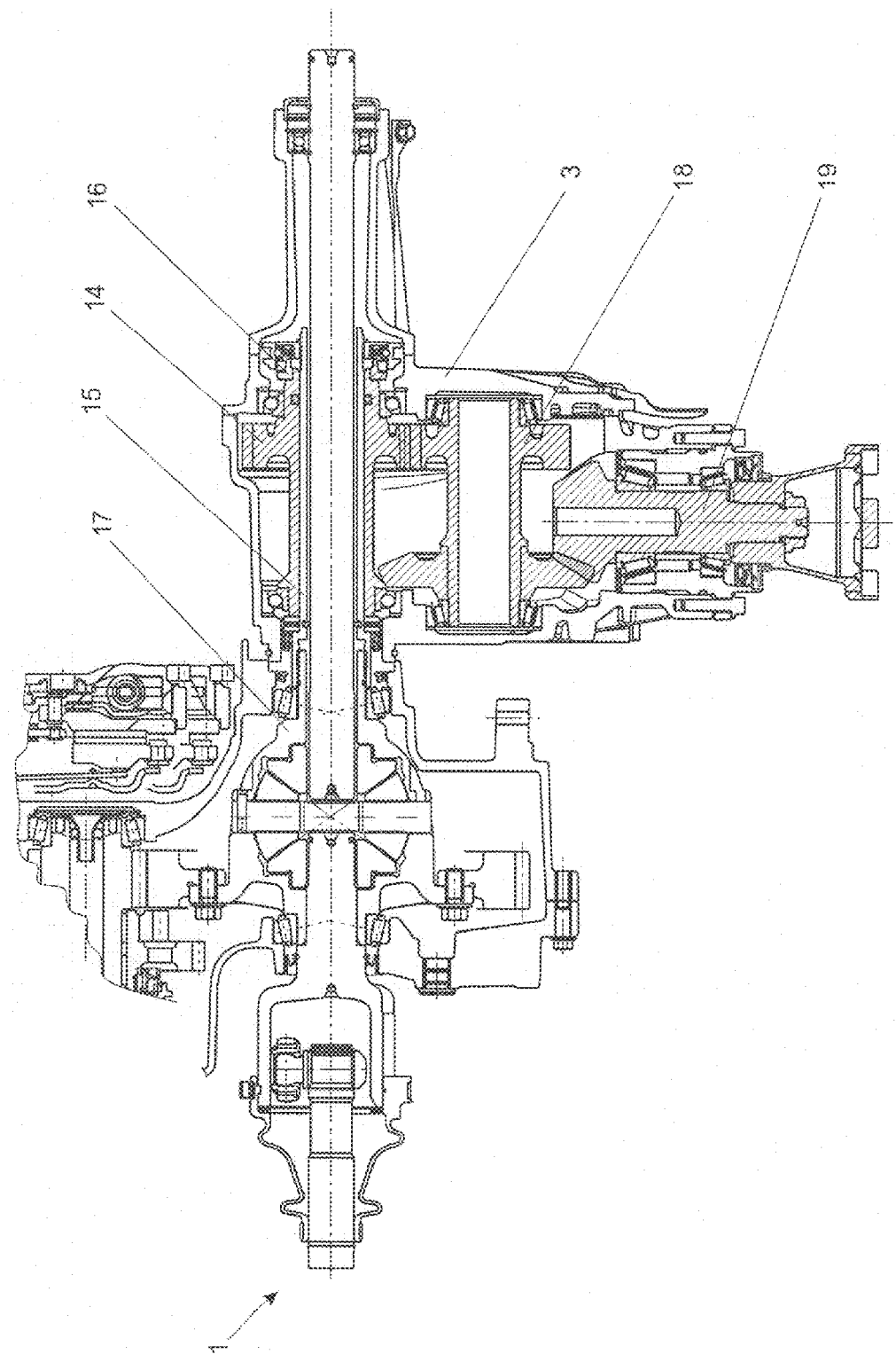
FIG. 4 illustrates a switch-on device of FIG. 3 in detail.

FIG. 4 shows the switch-on device 3 of FIG. 3 in detail. This is a switchable angular gear, in which the tight fit occurs from a spur gear step 14 engaging with a connecting shaft 15, which is permanently driven by the drive basket 17 of the primary axle differential, by means of a switch-on mechanism, formed here by synchronizing 16. As is evident from FIG. 4 when the secondary drive is switched off the spur gear step 14 does not rotate along with the permanently driven primary drive train. The coupling point between permanently driven primary drive train and connectable secondary drive train is therefore the synchronizing 16. When the secondary drive train is connected the spur gear step 14 transmits the secondary drive train output first via a transverse shaft 18 to a crown wheel which delivers the drive power in turn via a pinion shaft 19 to the intermediate shaft 11 and thus forwards it to the secondary axle.

Such a multi-level configuration of the forwarding of the secondary drive output flow is not mandatory. Other simplification steps can also be undertaken, for example by the connecting shaft 15 providing no spur gear, but a crown wheel for directly forwarding the secondary drive output to the pinion shaft.

To support the synchronizing of spur gear step 14 and connecting shaft 15 it is provided that the side shaft couplings are switched prior to synchronizing of the shafts to bring the intermediate shaft 11 and thus also the spur gear step 14 up to speed. The switch-on mechanism is actuated preferably hydraulically, but naturally can also be actuated another way, for example pneumatically, by electric motor or electromagnetically.

It is of course also feasible to provide other positive or also non-positive connecting mechanisms in addition to the positively working synchronizing illustrated in FIG. 4. A frictionally engaged coupling can also ensure the secondary drive output flow from the connecting shaft 15 to the spur gear step 14 in place of synchronizing. In this case positively working side shaft couplings could also be provided, whereby the advantages of a drive train without differential would be relinquished however. Nevertheless, there are cases where such a solution could be offered.

Figure 5:
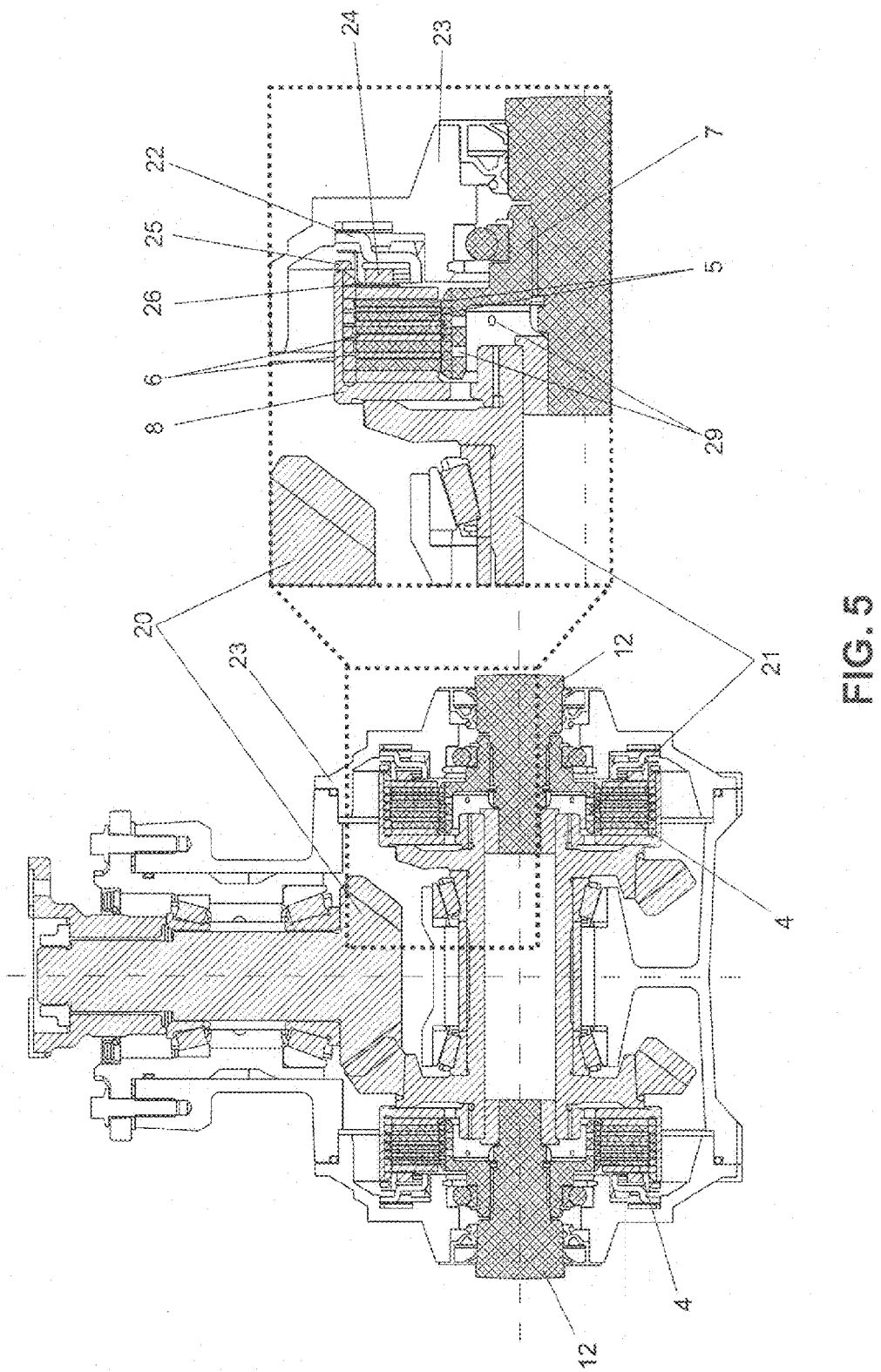
FIG. 5 illustrates a secondary axle drive without differential of FIG. 3 with loosened side shaft couplings in detail.
Figure 6:
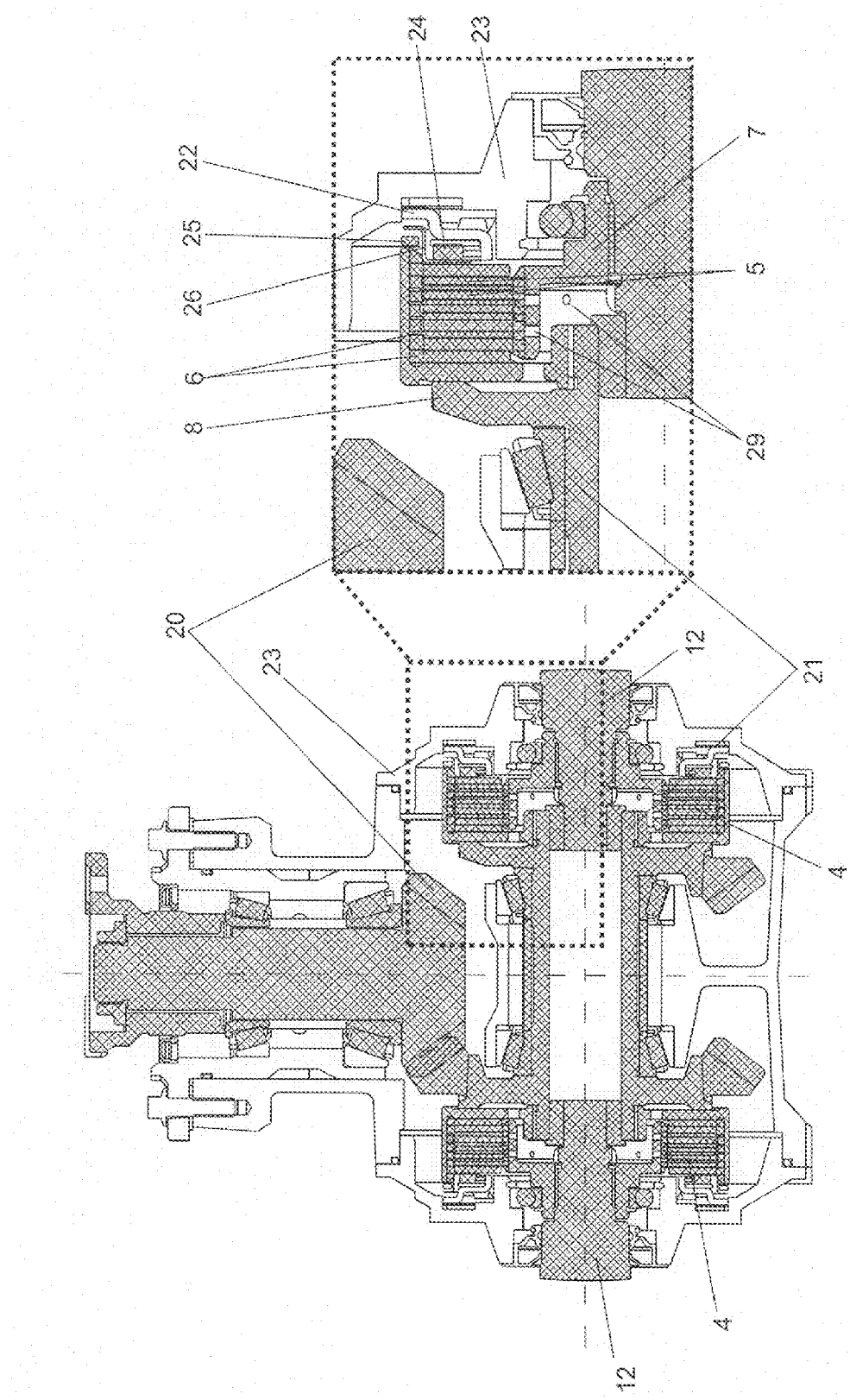
FIG. 6 illustrates a secondary axle drive without differential of FIG. 3 with closed side shaft couplings in detail.

FIGS. 5 and 6 show the secondary axle drive without differential already described for FIG. 3, whereby FIG. 5 shows the state when the secondary axle is switched off and FIG. 6 shows the state when the secondary axle is connected.

The drive sprocket 20 is connected torque-proof via a flange to the intermediate shaft and is engaged with a crown wheel. The crown wheel is connected solidly to a crown wheel carrier shaft 21. Its mounting in the axle drive housing guarantees that both the introduced torque and the gearing forces are absorbed. Outer plate carrier 8 of both couplings are connected torque-proof to the crown wheel carrier shaft 21. Positioned in between the outer plate carriers 8 and inner plate carrier 7 is a clutch pack of outer plates 6 and inner plates 5 of the side shaft couplings 4. The inner plate carrier 7 connected torque-proof to the inner plates is in turn connected to the side shaft 12 via a wedge gearing.

The clutch pack is compressed by a hydraulically actuated pressure piston 22 located in a lateral axle drive housing cover 23 and the coupling is closed, so that when the secondary axle is connected (hang-on mode) the drive power is generated via the clutch pack to the drive wheels. Arranged between clutch pack and pressure piston 22 is a thrust bearing 24 which guarantees the speed equalization between the standing pressure piston 22 and the rotating clutch pack.

FIG. 5 illustrates that in the switched-off mode only a few components of the rear axle rotate and the losses are kept to a minimum. When the secondary drive (FIG. 5 opened coupling) is switched off only the inner plate carrier 7 with the inner plates 5 connected thereto rotate from the coupling packet, and a few bearing components. The outer plate carrier 8 with the outer plates 6 and the pressure piston 22 are stationary. This is particularly advantageous, since the complete thrust bearing 24 likewise stalls due to this arrangement. The purpose of the ondular washer 25, which is supported between the outer plate carrier 8 and a Z disc 26 of the thrust bearing 24, is to press the clutch pack apart into the non-pressurized state so as to cause least possible friction. By comparison, with the coupling closed, all components of the rear axle (cogging, coupling and thrust bearing) rotate, as follows from a comparison of FIGS. 5 and 6, in which in each case the idling rear axle components are illustrated singly hatched and the rotating rear axle components are cross-hatched.

Figure 7:
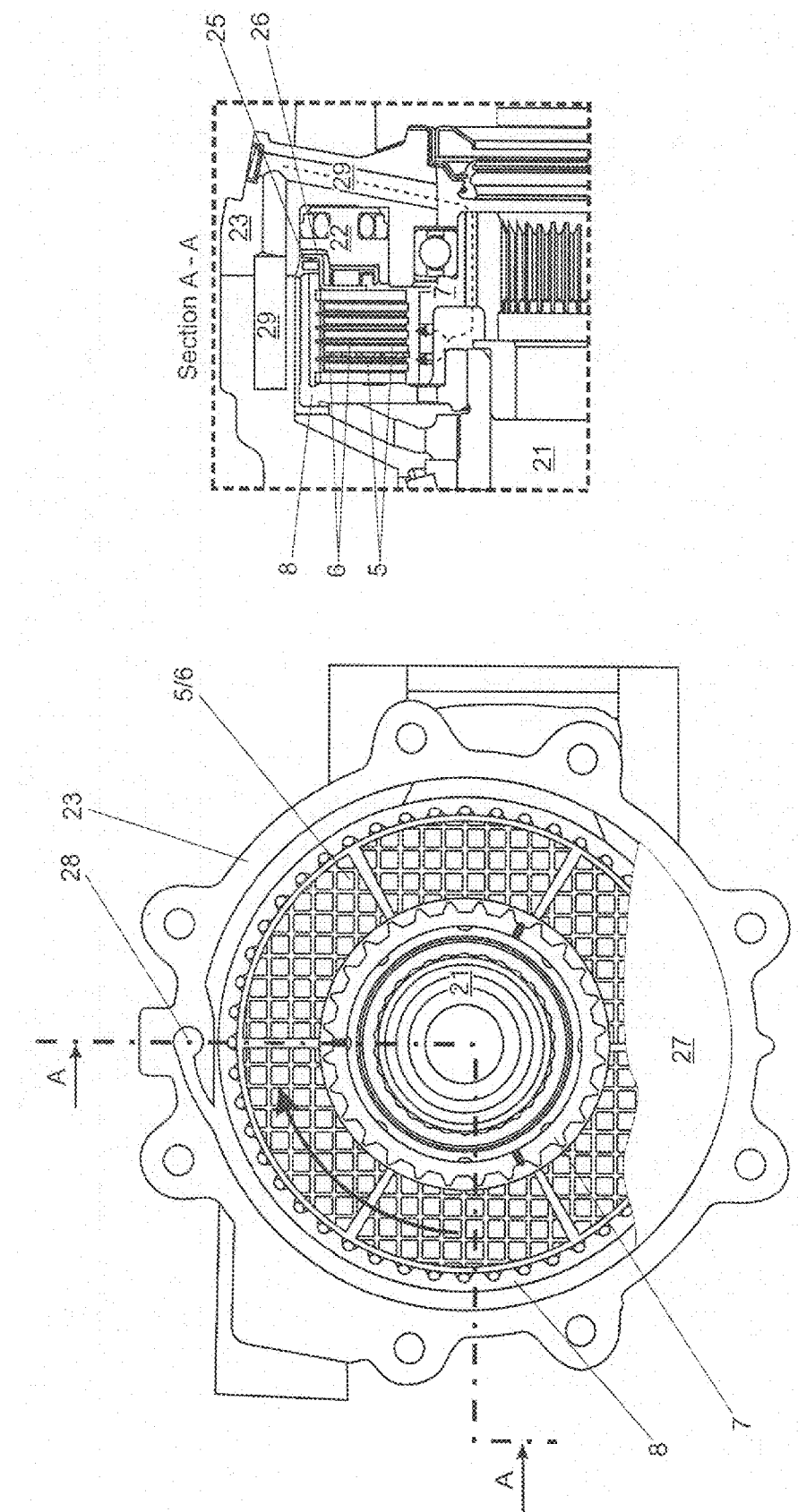
FIG. 7 illustrates a cross-section through a side shaft coupling of an axle drive without differential with on-demand self-lubrication.

A further aspect minimizing the power loss in the secondary drive train and contributing to the inventive idea is on-demand oiling of the side shaft couplings or respectively the clutch pack, illustrated in FIG. 7. If the side shaft coupling 4 is closed, outer plate carrier 8 rotates and with its outer side scoops oil from an oil sump 27, which is formed in FIG. 7 from the coupling housing, thus delivering oil to the oil trap 28. From there the oil reaches the inner plate carrier via the oil line bores 29 and is distributed radially outwards by centrifugal force. This lubrication serves to lubricate and cool the clutch pack. If the side shaft coupling however is opened and the secondary drive train is switched off, such that the coupling has no cooling and lubricating requirement, the outer plate carrier is stationary and there is consequently no oil supplied, which likewise contributes to a diminishing of power losses when the secondary drive train is uncoupled.

With the side shaft couplings 4 power loss can also be saved by the friction plates of the side shaft couplings 4 being configured differently, depending on whether they are outer plates 6 or inner plates 5. The inner plates 7, therefore the friction plates, which, as previously described, are preferably connected torque-proof to the side shafts 12 of the secondary axle 2 and accordingly revolve permanently, can be configured as blank steel discs with a relatively low-friction surface. If these rotate during travel with constant contact with cooling and lubricating oil, they cause only minor friction losses. But the outer plates 6, which are preferably idle anyway when the secondary axle drive train is disconnected, can present the actual friction lining and channeling delivering lubricating and cooling oil arranged herein or separately.

In a schematic illustration FIGS. 8, 9a, 9b and 10 show possible drive concepts, in which the principle of the invention is embodied, whereby the invention is understandably not restricted to the three illustrated drive concepts.

Figure 8:
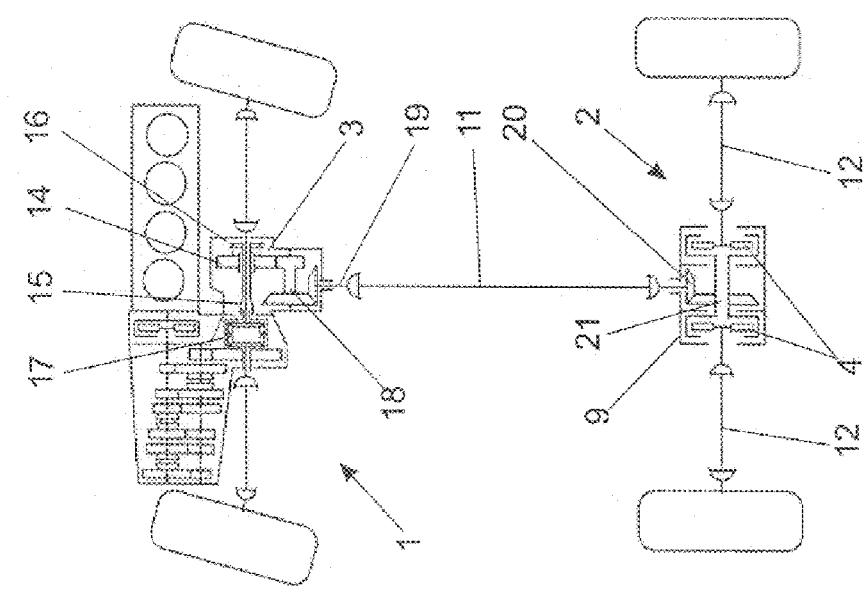
FIG. 8 illustrates a first possible drive train concept (transversely inbuilt front motor with permanent front drive and connectable rear axle) in schematic illustration.

FIG. 8 shows a drive train with transversely integrated front motor and permanent front drive (primary drive train with primary axle 1) and a secondary axle 2 connectable via a switch-on device 3, which are connected to one another via an intermediate shaft 11 (secondary drive train), as a possible drive train concept. The secondary axle drive, therefore the drive of the secondary side shafts 12, is achieved by side shaft couplings 4 without differential. FIG. 8 corresponds to the drive train already shown in FIG. 3.

Figure 9B:
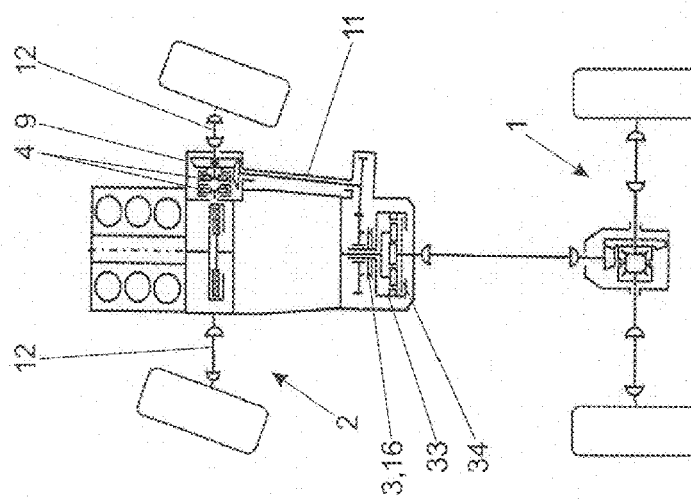
FIG. 9b illustrates a drive train concept corresponding as far as possible to the drive train concept according to FIG. 9a with a blockable center differential.
Figure 9A:
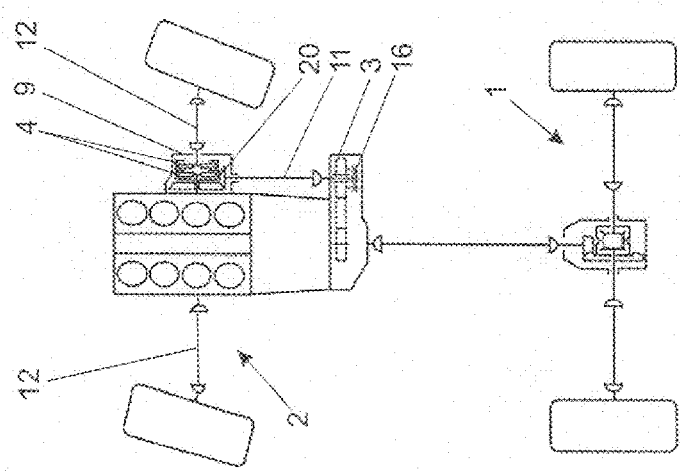
FIG. 9a illustrates a second possible drive train concept (along inbuilt front motor with permanently driven rear axle and connectable front axle) in schematic illustration.

FIGS. 9a and 9b show as second possible drive train concept a drive train with a longitudinally inbuilt front motor and permanently driven rear axle as primary axle 1. The front axle with the secondary side shafts 12 can be connected to the primary drive train as secondary axle 2 as required via the switch-on device 3, the intermediate shaft 11 and the side shaft couplings 4.

In FIG. 9b there is the special case where an additional center differential 33 is provided. This can inter alia for den Fall, that the synchronizing 16 opened is and thus no drive power is transmitted to the intermediate shaft 11, be blocked by a coupling 34, so that no differential function is fulfilled, but revolves as block and drives the primary axle 1 as loss-free as possible. If connection is made via the switch-on device 3 and the synchronizing 16 of the secondary drive train, the intermediate shaft 11 is also driven by the beveloid gearing and, as described earlier, the drive power is transmitted via the side shaft couplings 4 to the side shafts 12 of the secondary axle. The coupling 34 can in this case be opened so that the center differential 33 functions as open differential and assumes a longitudinal equalization function. Alternatively, the center differential also can be omitted, whereby the side shaft couplings 4 must then take over longitudinal equalization. It is also possible of course to block the planetary gear of the center differential 33 using the switch-on mechanism 3.

Figure 10:
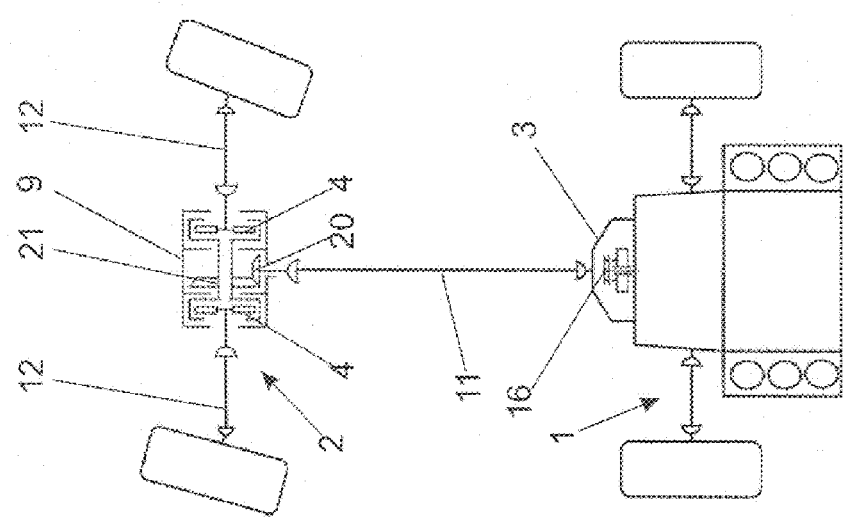
FIG. 10 illustrates a third possible drive train concept (rear-mounted engine with permanently driven rear axle and connectable front axle) in schematic illustration.

FIG. 10 shows a drive train with rear-mounted engine. As in FIGS. 9a and 9b the rear axle here too is the permanently driven axle and thus the primary axle 1. The intermediate shaft 11 is flange-mounted on a switch-on device 3 arranged on the rear axle drive and transmits the secondary drive train output as required via the front axle drive without differential having side shaft couplings 4. The front axle forms the secondary axle 2 with the secondary side shafts 12.

Common to all drive concepts illustrated in FIGS. 8, 9a, 9b and 10 is that the part of the secondary axle drive train located between the switch-on device 3 and the side shaft couplings 4 stands completely idle when the secondary drive is switched off and thus causes no power loss.

Figure 11:
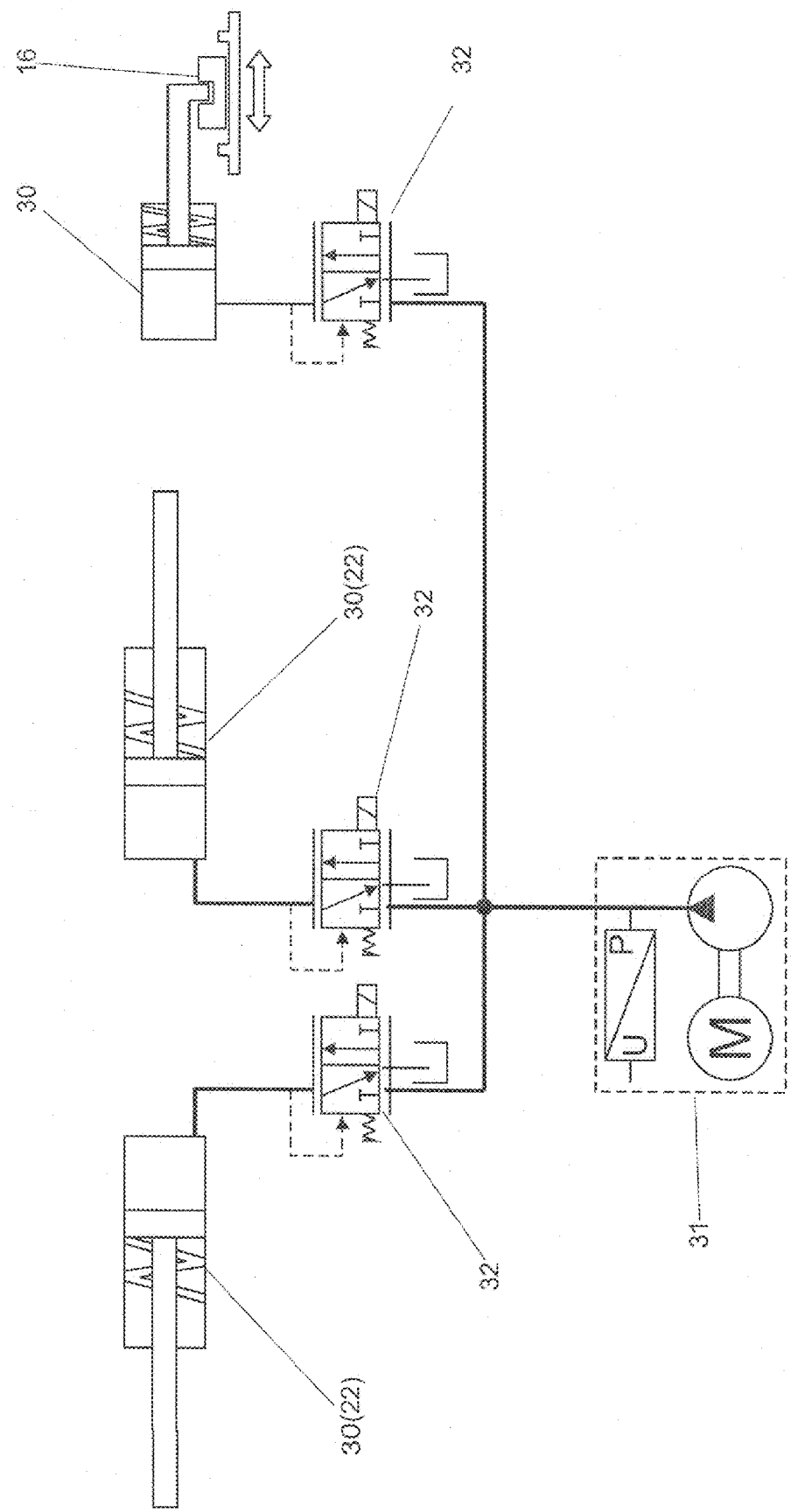
FIG. 11 illustrates a schematically illustrated hydraulic circuit for triggering the switching and adjusting elements of the drive train.

FIG. 11 shows a schematic overview of a possible hydraulic circuit configuration. The side shaft couplings and/or the switch-on mechanism 3 of the switch-on device are preferably supplied by a hydraulic unit 31 regulated according to requirements with pressurized oil, with which the pressure piston 22 in FIGS. 5 and 6 is activated. In so doing, the hydraulic unit 31 provides system pressure which is oriented to the highest momentarily required pressure. The currently required pressure is adjusted in the side shaft couplings via the pressure-reduction valves 32. Also, the secondary drive train is connected via a pressure-reduction valve 32 by the switch-on mechanism of the switch-on device. As soon as the switch-on mechanism has connected the secondary drive train and transmission of the secondary drive output is ensured, the switch pressure acting on the switch-on mechanism can be relieved again.

The hydraulic actuation schematically illustrated in FIG. 11 can understandably also executed be in other ways. Synergies result for example from using double coupling gears. The hydraulic actuator 30 of the switch-on device and/or the side shaft couplings can be operated directly by the hydraulics of the double coupling gear in spatial proximity to the double coupling gear. In the event where both the switch-on device and the side shaft couplings are arranged near the gearbox, the hydraulic unit 31 can even be dispensed with completely. The pressure-reduction valves can then be integrated in the double coupling gear.

The above-described invention is based on a so-called hang-on four-wheel drive. In contrast to the permanent four-wheel drive with the hang-on system the second axle is actively connected as required via a coupling. Evaluations of load spectrum data show that the hang-on systems have only minor "active time slices" in the vehicle cycle. The invention utilizes the non-active time slices to eliminate the power losses of the revolving drive components through complete shutdown of the four-wheel drive train.

As mentioned, the invention is described within the scope of a drive train concept, wherein switching off the all-wheel drive is done at the rear axle via both couplings. The drive train to the rear axle gearbox is uncoupled at the PTU (power take off unit) via a switch-on device 3 which preferably has synchronizing 16.

The disadvantage inter alia of the design shown in FIG. 8 however is that with particularly high-torque off-road vehicles the torque is transmitted only via the exclusively frictionally engaged acting side shaft couplings 4 to the wheels of the secondary axle. Transmission of the drive torque exclusively via the frictionally engaged side shaft couplings is a disadvantage for particularly high-torque off-road vehicles, since this can result in substantial heat generation due to friction losses in the coupling packet. A positively working differential on the other hand works quasi loss-free and is accordingly best suited to high-torque vehicles.

Figure 12:
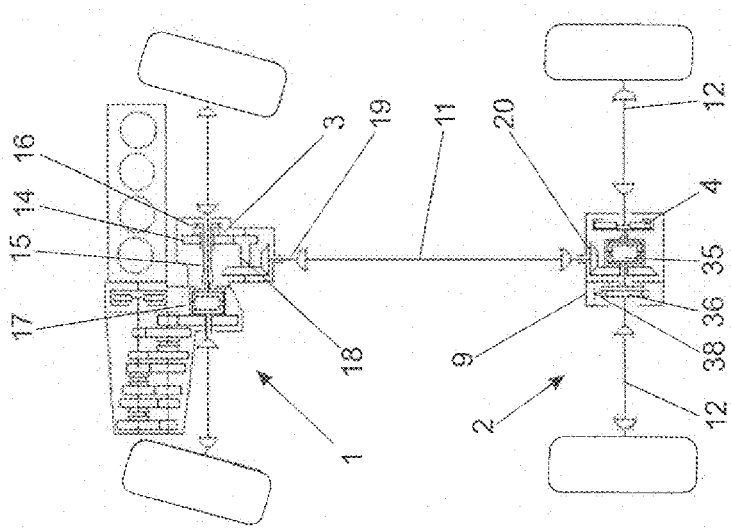
FIG. 12 illustrates a drive train concept substantially corresponding to FIG. 8, wherein a positively acting side shaft coupling is provided one-sided on the secondary axle.

FIG. 12 shows a configuration adapted for high-torque vehicles of the above-described described invention, which provides a shutoff system for shutting off the secondary axle 2 with a positively acting secondary axle differential 35, a positively acting lateral side shaft coupling 36 and with an additional switching element for this coupling with secondary axle synchronizing 38. The switching element or respectively the secondary axle synchronizing 38 should be able to engage and disengage the positively acting coupling 36.

Figure 13:
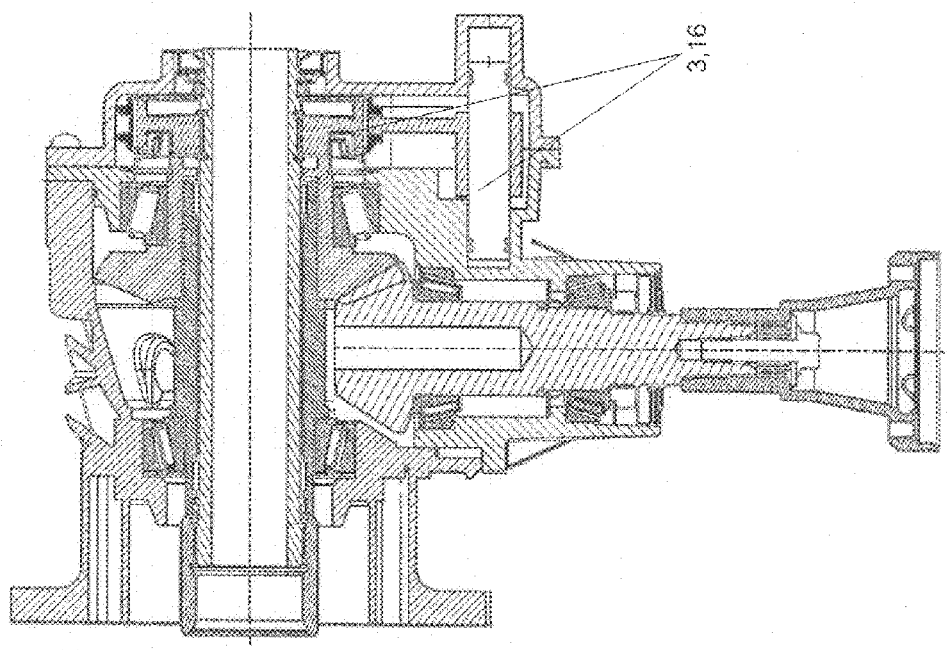
FIG. 13 illustrates a first depiction of a connection device provided on the primary axle with a synchronizing unit.

As already described, the shutoff at the PTU is done advantageously for comfort reasons via synchronizing 16 of a switch-on device 3. Placing the switch-on device 3 together with synchronizing 16 to the left of the crown wheel can be managed relatively easily, as FIG. 13 shows in detail. But the disadvantage of placing it in this position is that the structural space requirement on the PTU diminishes considerably.

Figure 14:
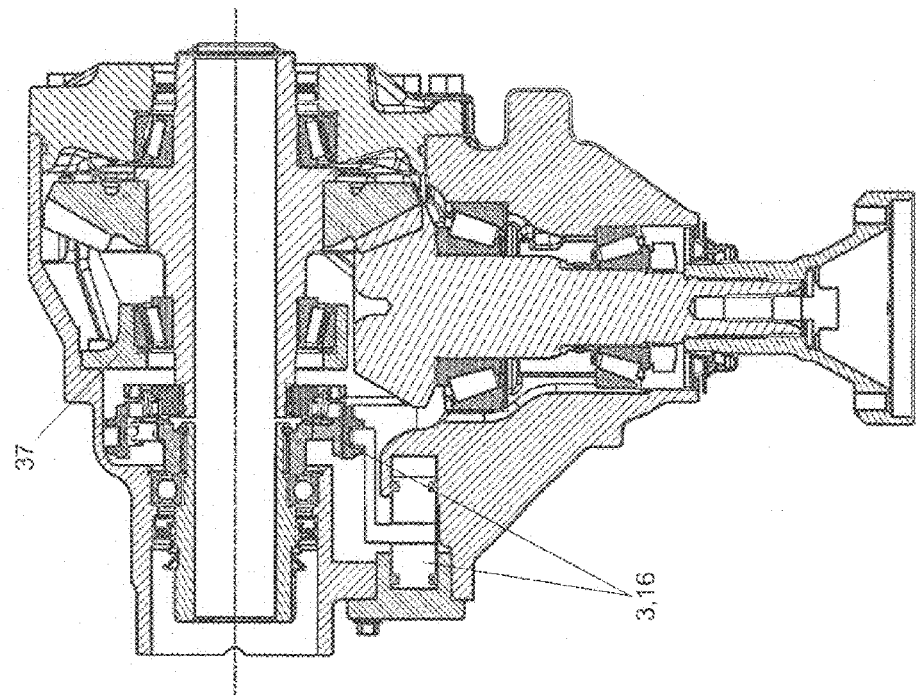
FIG. 14 illustrates a second depiction of a connection device provided on the primary axle with a synchronizing unit.

It is therefore proposed to place the synchronizing within the available PTU housing, as FIG. 14 illustrates. For this, the left crown wheel bearing is fixed in the housing by a separate end shield 37. This end shield 37 is attached to the PTU housing using screws or other suitable fasteners to mount the synchronizing.

The synchronizing is preferably placed between the crown wheel shaft and the drive shaft. As is evident from FIG. 14, the synchronizing unit 16 and the associated wiring fit in the available sleeve curve of the PTU. The advantage of this for the client is that the PTU which can be switched off fits in the available package.

Figure 15:
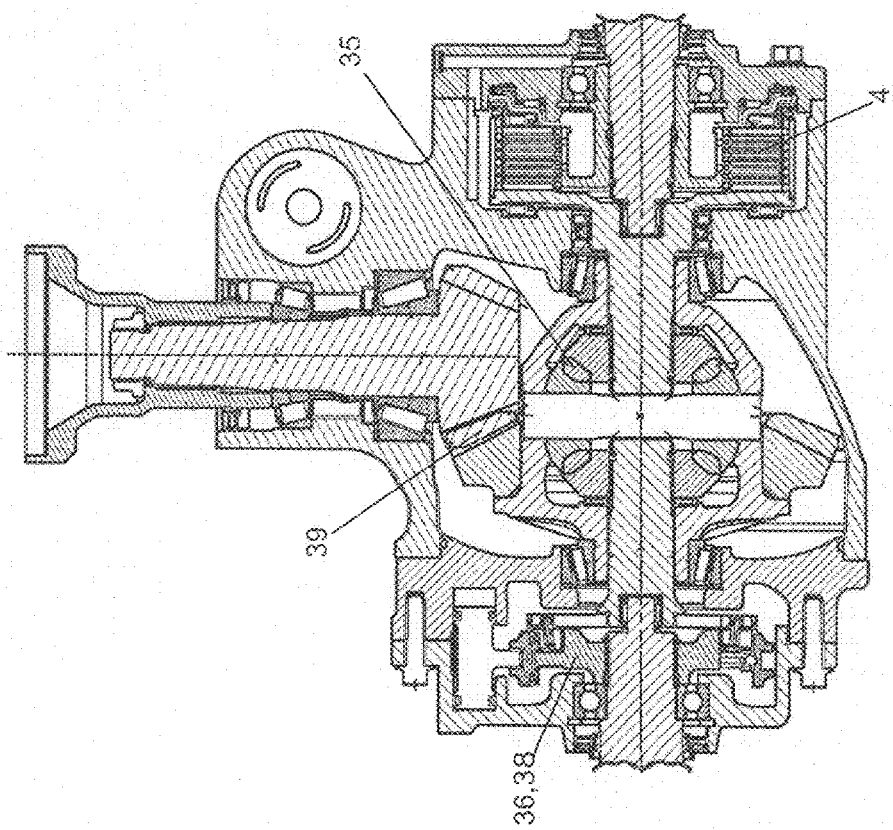
FIG. 15 illustrates an axle drive unit driving the secondary axle with a positively acting side shaft coupling for the left side shaft.

Provided on the rear axle to the left next to the secondary axle differential 35 is a positively acting side shaft coupling 36 which is connected via a switching element to a secondary axle synchronizing 38 (FIG. 15). Located to the right next to the secondary axle differential is a frictionally engaged acting side shaft coupling 4. The coupling takes on a double function.

In the activated four-wheel drive train, enclosing all synchronizings 16, 38, the side shaft coupling 4 works as a hang-on system, in which the torque is transmitted in doses to the wheels. If the coupling is open no torque is transmitted to the wheels, since the differential can revolve freely in the axle body and is not supported. In the deactivated four-wheel drive train, therefore in the secondary axle 2 not integrated in the drive power transmission, the left synchronizing 38 is opened so that both side shafts 12 and therefore also the wheels have no connection to the rear axle components. This state has a particularly consumption-reducing effect, since the axle components do not rotate and thus generate no losses, in particular also if the frictionally engaged side shaft coupling 4 illustrated in FIG. 15 is opened at the same time.

Figure 16:
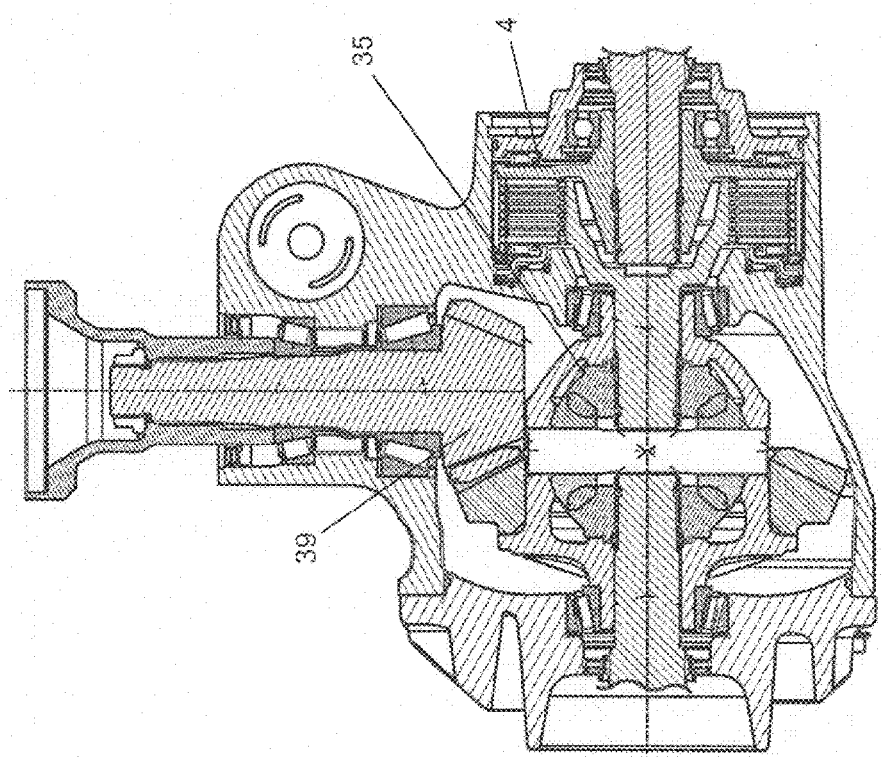
FIG. 16 illustrates an axle drive unit driving the secondary axle, in which the a side shaft coupling is completely omitted on one side.

In a further modification it is proposed on costing grounds to dispense with the additional shutoff on the rear axle (FIG. 16). In contrast to the solution according to FIG. 15, in which all parts of the axle are idle in the switched-off mode, the pinions of the secondary axle differential 35 still rotate, since separation of the left side shaft from the balancing wheel set is missing by the lack of synchronizing or respectively coupling and these therefore also rotate. As compared to the solution in FIG. 15 a minor consumption disadvantage is to be expected by this circumstance. This disadvantage is countered by the lower expenditure.

The advantage is that the manufacturer or respectively the client can choose between the more preferably consumption-optimized solution or a more preferably cost-optimized solution. Connecting the all-wheel drive during travel should also happen in μ-jump or respectively μ-split conditions without loss of comfort and not be perceived as disruptive by the driver. The use of both synchronizing on the rear axle (secondary axle synchronization 38) and synchronization 16 on the PTU acts advantageously for the connecting speed. This connection is described herein below for the drive train shown in FIG. 12.

With connecting during travel the secondary axle synchronization 38 on the rear axle is first closed and thus the differential wheels are accelerated to speed. Next the side shaft coupling 4 is closed. The complete rear axle and the intermediate shaft 11 configured as a cardan shaft and the disconnected part of the PTU are thus accelerated via the wheels. As a last resort, the synchronous unit 16 is set on the PTU and the traction to the gearbox is established. The advantage of this switching sequence is that the complete drive train is accelerated by the rear wheels and the side shaft coupling 4. In particular it is gradually accelerated, so that synchronizings are relieved, since the mass of the components, to be accelerated for the purpose of speed adjustment, remains comparatively low.

In the case of a connection under μ-jump conditions—the front wheels spin and the rear axle is stationary—the synchronizing 16 is first connected to the PTU and the drive train as far as the rear axle is accelerated. Next the secondary axle synchronization 38 is laid on the rear axle and the connection is made to the left rear wheel. The drive torque can be delivered incrementally to the rear wheels with subsequent connection of the frictionally engaged side shaft coupling 4. The same advantages as described earlier for connecting during travel can also be realized.

Figure 17:
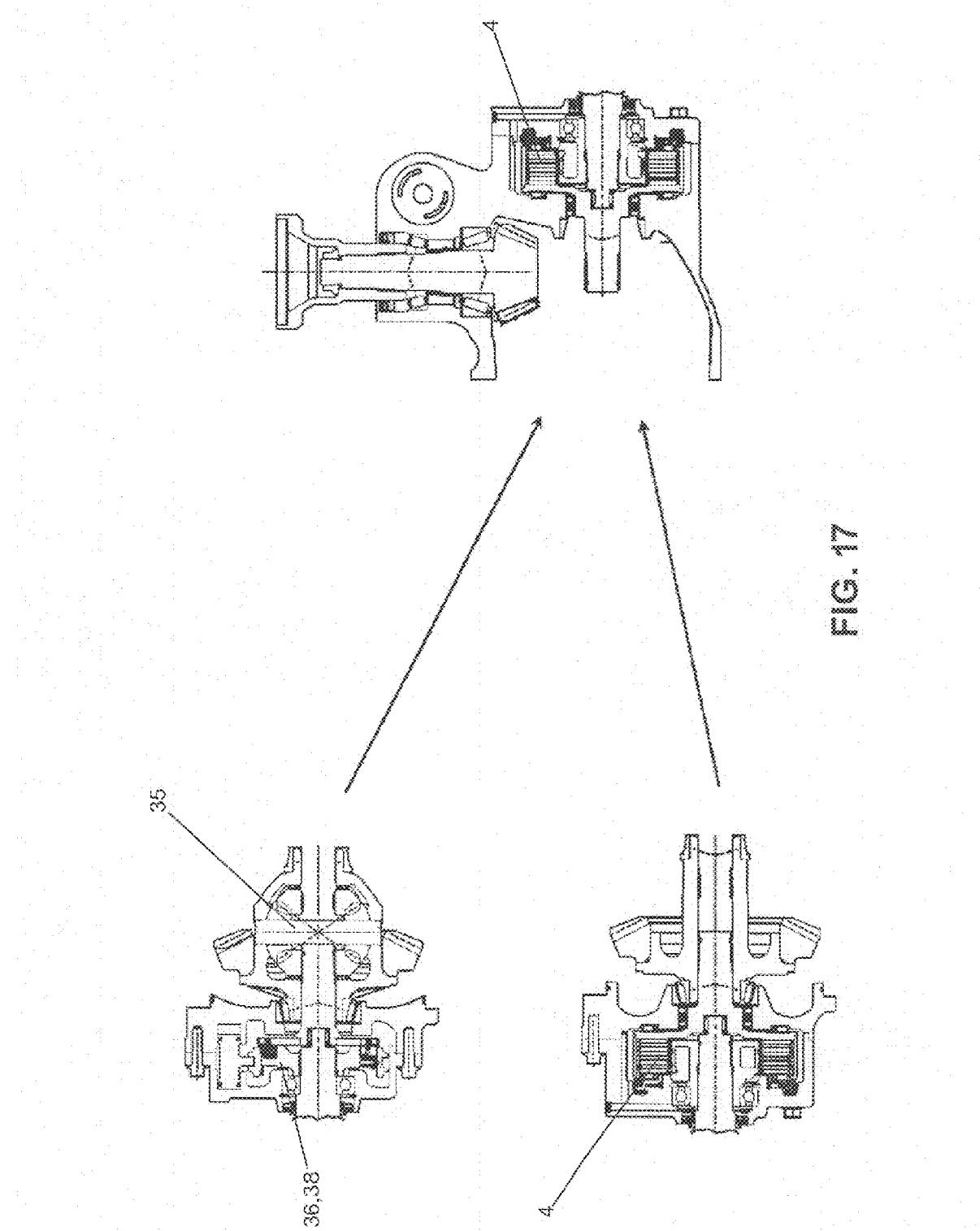
FIG. 17 illustrates a graphic depiction of a modular construction realizing the invention, of a secondary axle drive unit.

FIG. 17 shows a modular axle construction, in which a secondary axle with two side shaft couplings 4 can easily be assembled also by exchanging the left synchronous unit. This modularity enables the same basic construction in high-torque off-road vehicles with differential as can be employed in sports vehicles with two side shaft couplings 4 and axle drive without differential. The secondary axle drive unit is therefore built modular such that a frictionally engaged working coupling or a positively acting coupling can be used selectively as second coupling.

A drive train of a vehicle is described, comprising a permanently driven primary axle and a secondary axle connectable to the primary axle via switch-on device, in particular one or more positively acting synchronization units having a switch-on device.

A secondary axle drive unit for the drive train defined in the previous paragraph was likewise described, having a frictionally engaged acting first coupling and a second coupling, in particular a positive second coupling acting as synchronizing, via which the driven shafts cooperating with the secondary axle drive can be uncoupled from the secondary axle drive. This secondary axle drive unit is preferably built modular such that a frictionally engaged working coupling or a positively acting coupling can be selectively used as second coupling. Also, a housing for such a modular built secondary axle drive unit was described.

The invention claimed is:

1. A drive train of a vehicle, comprising a primary drive train and a secondary drive train, further comprising:
   a primary axle which is permanently driven via the primary drive train; and
   a secondary axle as part of the secondary drive train;
   wherein the secondary axle is connectable to the primary axle via a switch-on mechanism of a switch-on device in order to allow the integration of the secondary drive train into the drive train so that the overall drive train power is transferred over both the primary axle and the secondary axle, and
   wherein when the secondary axle is connected to the primary axle, the secondary drive train power is conveyed via at least one side shaft couplings into side shafts of the secondary axle and is transmitted to wheels of the secondary axle the secondary drive train having a shutdown section located between the switch-on device and the at least one side shaft coupling, whereby:
   the switch-on mechanism and/or the side shaft couplings comprise at least one frictionally engaged coupling and when the secondary axle is disconnected from the primary axle in order to transfer the overall drive train power via the primary axle only, the shutdown section of the secondary drive train is decoupled from both the primary axle of the primary drive train and the wheels of the secondary axle.

2. The drive train as claimed in claim 1, having a side shaft coupling for each side shaft of the secondary axle and wherein when the secondary axle is connected to the primary axle, the side shaft couplings allow a driving power distribution without a differential gearing between the drive wheels of the secondary axle to ensure transverse compensation.

3. The drive train as claimed in claim 1, having a side shaft coupling for each side shaft of the secondary axle and wherein when the secondary axle is connected to the primary axle, the side shaft couplings allow a drive power distribution without differential gearing between the primary axle and the secondary axle, to ensure longitudinal compensation.

4. The drive train as claimed in claim 1, wherein the switch-on device comprises a positively working power transmission gearing having an angular gear working via cogged wheels.

5. The drive train as claimed in claim 4, wherein the switch-on device is arranged on the primary axle and the secondary drive train output is, when the secondary drive train is connected to the primary axle, engaged to the primary drive train by the switch-on mechanism.

6. The drive train as claimed in claim 5, wherein a speed synchronization in the switch-on mechanism of the power transmission gearbox for the establishment of a positive lock is supported by the at least one side shaft couplings.

7. The drive train as claimed in claim 6, wherein the at least one side shaft couplings is formed by a frictionally engaged multiple disc clutch, whereby the friction plates connected in a torque-proof way to the secondary drive wheels cooperate as inner plates with an inner plate carrier and whereby the friction plates located on the drive train-side of the vehicle cooperate with an outer plate carrier as outer plates.

8. The drive train as claimed in claim 7, wherein the outer plate carrier supplies oil for cooling and/or lubrication of the friction plates when the secondary axle is connected to the primary axle.

9. The drive train as claimed in claim 8, wherein the side shaft couplings comprise a first, frictionally engaged acting side shaft coupling for a first side shaft and a second, positively acting side shaft coupling for a second side shaft.

10. The drive train as claimed in claim 9, wherein a secondary axle synchronizing is provided for switching the positively acting side shaft coupling.

11. The drive train as claimed in claim 10, wherein a positively acting differential gearing is provided for transmitting the drive train power of the secondary drive train to the side shafts of the secondary axle.

12. The drive train as claimed in claim 11, wherein an axle drive unit of the secondary axle is constructed modular such that a frictionally engaged working coupling or a positively acting coupling can be used selectively as a second coupling.

* * * * *